(12) United States Patent
Becker et al.

(10) Patent No.: US 10,473,771 B2
(45) Date of Patent: *Nov. 12, 2019

(54) METHOD FOR OPTICALLY SCANNING AND MEASURING AN ENVIRONMENT USING A 3D MEASUREMENT DEVICE AND NEAR FIELD COMMUNICATION

(71) Applicant: FARO Technologies, Inc., Lake Mary, FL (US)

(72) Inventors: Reinhard Becker, Ludwigsburg (DE); Martin Ossig, Tamm (DE); Andreas Ditte, Ludwigsburg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 420 days.

This patent is subject to a terminal disclaimer.

(21) Appl. No.: 15/386,383

(22) Filed: Dec. 21, 2016

(65) Prior Publication Data

US 2017/0184710 A1 Jun. 29, 2017

(30) Foreign Application Priority Data

Dec. 27, 2015 (DE) .................. 10 2015 122 846

(51) Int. Cl.
*G01B 11/00* (2006.01)
*G01S 17/32* (2006.01)
(Continued)

(52) U.S. Cl.
CPC .......... *G01S 7/4912* (2013.01); *G01B 11/002* (2013.01); *G01S 7/4817* (2013.01);
(Continued)

(58) Field of Classification Search
CPC .... G01S 17/023; G01S 7/4817; G01S 7/4912; G01S 17/32; G01S 17/42; H04W 4/80; G01B 11/002; H04B 5/0031
(Continued)

(56) References Cited

U.S. PATENT DOCUMENTS

2010/0007513 A1  1/2010  Horky et al.
2012/0262550 A1* 10/2012  Bridges ............... G01C 15/002
                                                    348/46
(Continued)

FOREIGN PATENT DOCUMENTS

DE   102009015922 A1   10/2010
DE   102009055988 B3    3/2011
(Continued)

OTHER PUBLICATIONS

Great Britain Search Report for Application No. GB1622189.7 dated Jun. 23, 2017; 3 pgs.

*Primary Examiner* — Daniel L Murphy
(74) *Attorney, Agent, or Firm* — Cantor Colburn LLP

(57) ABSTRACT

A method for scanning and measuring using a 3D measurement device is provided. The method includes providing the 3D measurement device having a light emitter, a light receiver and a command and evaluation device. The 3D measurement device is further includes a first near-field communication (NFC) device having a first antenna. A second NFC device having a second antenna is positioned adjacent the 3D measurement device. An NFC link is established between the first NFC device and the 3D measurement device. An identifier is transmitted from the second NFC device to the 3D measurement device. It is determined that the second NFC device is authorized to communicate with the 3D measurement device. Commands are transferred to the 3D measurement device from the second NFC device based at least in part on the determination that the second NFC device is authorized to communicate with the 3D measurement device.

8 Claims, 8 Drawing Sheets

(51) Int. Cl.
   *G01S 17/42*  (2006.01)
   *H04B 5/00*   (2006.01)
   *G01S 7/491*  (2006.01)
   *G01S 17/02*  (2006.01)
   *G01S 7/481*  (2006.01)
   *H04W 4/80*   (2018.01)
   *H04W 4/00*   (2018.01)

(52) U.S. Cl.
   CPC ............ *G01S 17/023* (2013.01); *G01S 17/32* (2013.01); *G01S 17/42* (2013.01); *H04B 5/0031* (2013.01); *H04W 4/80* (2018.02)

(58) Field of Classification Search
   USPC ........................................................ 356/5.01
   See application file for complete search history.

(56) References Cited

U.S. PATENT DOCUMENTS

| | | |
|---|---|---|
| 2013/0300740 A1 | 11/2013 | Snyder et al. |
| 2015/0330761 A1 | 11/2015 | Gong |
| 2017/0184711 A1* | 6/2017 | Becker .................... H04W 4/80 |

FOREIGN PATENT DOCUMENTS

| | | |
|---|---|---|
| EP | 2005112 B1    | 12/2008 |
| WO | 2010108643 A1 | 9/2010 |
| WO | 2015175460 A1 | 11/2015 |

\* cited by examiner

METHOD FOR OPTICALLY SCANNING AND MEASURING AN ENVIRONMENT USING A 3D MEASUREMENT DEVICE AND NEAR FIELD COMMUNICATION

CROSS REFERENCE TO RELATED APPLICATIONS

The present application claims priority to German Patent Application No. 10 2015 122 846.7 filed on Dec. 27, 2015, the contents of which are incorporated by reference herein in their entirety.

BACKGROUND

German patent application DE 10 2009 055 988 B3 discloses a 3D measurement device, designed as a laser scanner, for a known method. A measuring head which is rotatable relative to a base about a first axis emits an emitted light beam by means of a light emitter and a mirror which is rotatable relative to the measuring head about a second axis, and receives, by means of the mirror and a light receiver, a reception light beam reflected or otherwise scattered by an object in the environment of the laser scanner. A control and evaluation device determines at least the distance from the object for each of a plurality of measuring points. The angular position sensors assigned to the two axes supply the related angles. With this method, the 3D coordinates of the measuring points can be determined, based on an initial initialization. The rotor that supports the mirror is balanced by a variety of recesses. A color camera integrated into the measuring head supplies 2D color images. In EP 2 005 112 B1, a line camera is mounted at the top of the measuring head.

German patent application DE 10 2009 015 922 A1 discloses a known method in which a scene is registered using multiple scans. To accomplish this, after generating one scan, the laser scanner is moved to a new location to generate another scan. The measuring points of the generated scans are registered in a common system of coordinates, and the measuring points together form a three-dimensional point cloud.

BRIEF DESCRIPTION

According to one aspect of the disclosure a method for optically scanning and measuring an environment using a 3D measurement device is provided. The method includes providing the 3D measurement device having a light emitter operable to emit at least one emission light beam, the 3D measurement device further having a light receiver operable to receive at least one reception light beam, the 3D measurement device further having a control and evaluation device that is operable to determine at least the distance to an object for each of a plurality of measuring points based at least in part on the at least one emission light beam and the at least one reception light beam. The 3D measurement device is further provided with a first near-field communication (NFC) device that is electrically coupled to the control and evaluation device, the first NFC device having a first antenna. A second NFC device is positioned adjacent the 3D measurement device, the second NFC device having a second antenna. An NFC link is established between the first NFC device and the 3D measurement device. An identifier is transmitted from the second NFC device to the 3D measurement device. It is determined that the second NFC device is authorized to communicate with the 3D measurement device based at least in part on the identifier. Commands are transferred to the 3D measurement device from the second NFC device based at least in part on the determination that the second NFC device is authorized to communicate with the 3D measurement device.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
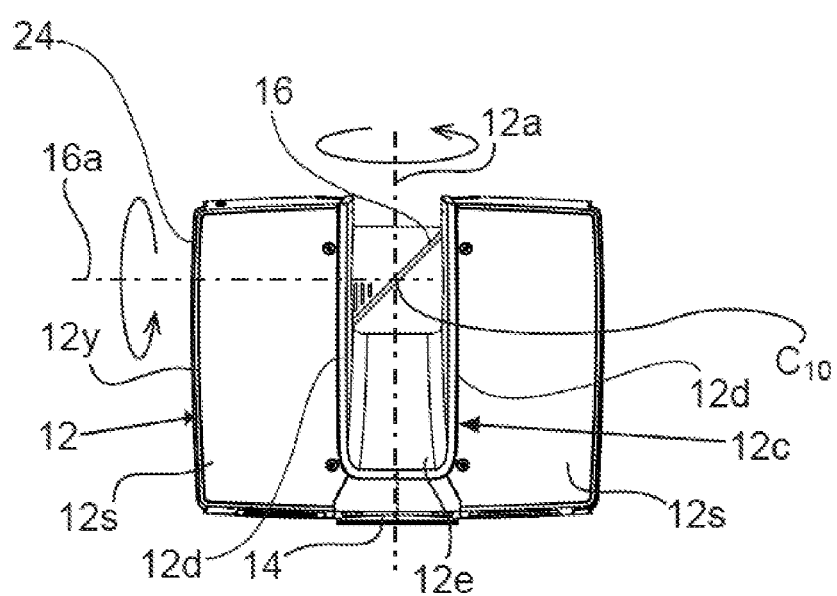
FIG. 1 is a side view of an example of a 3D measurement device.
Figure 2:
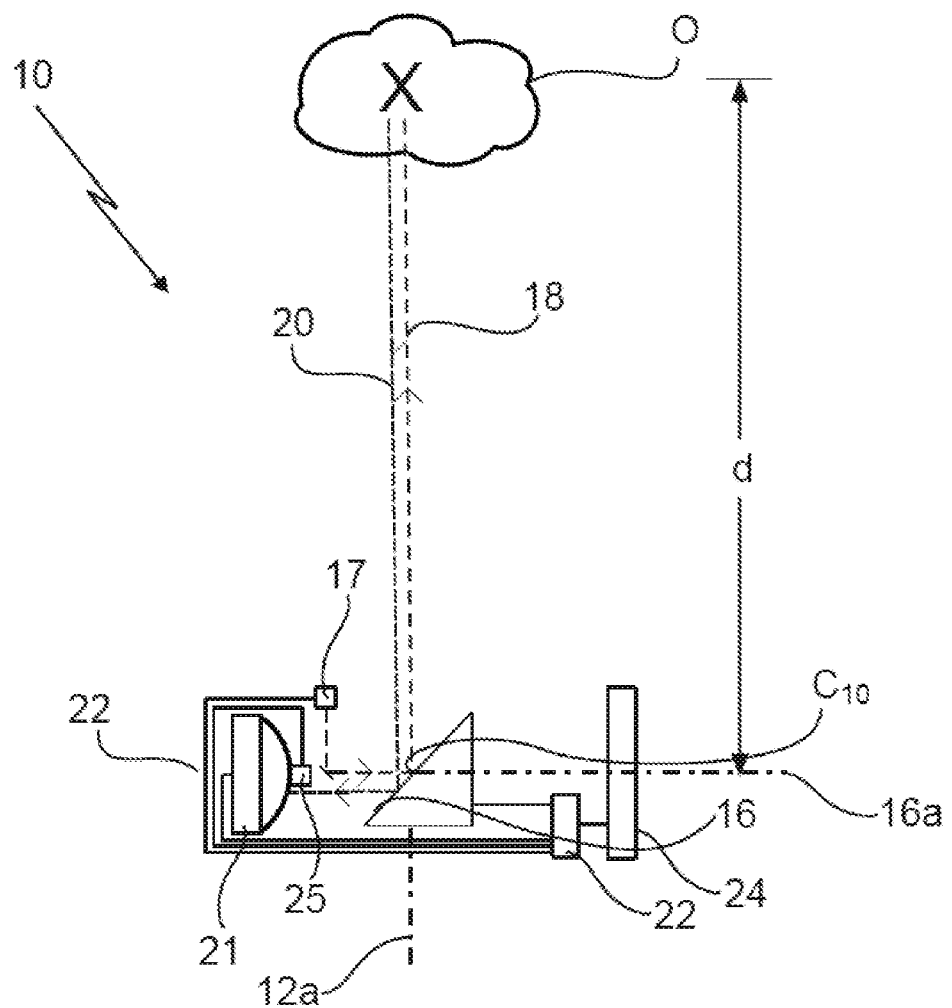
FIG. 2 is a schematic representation of the beam path, including a number of optical and electronic components.
Figure 3:
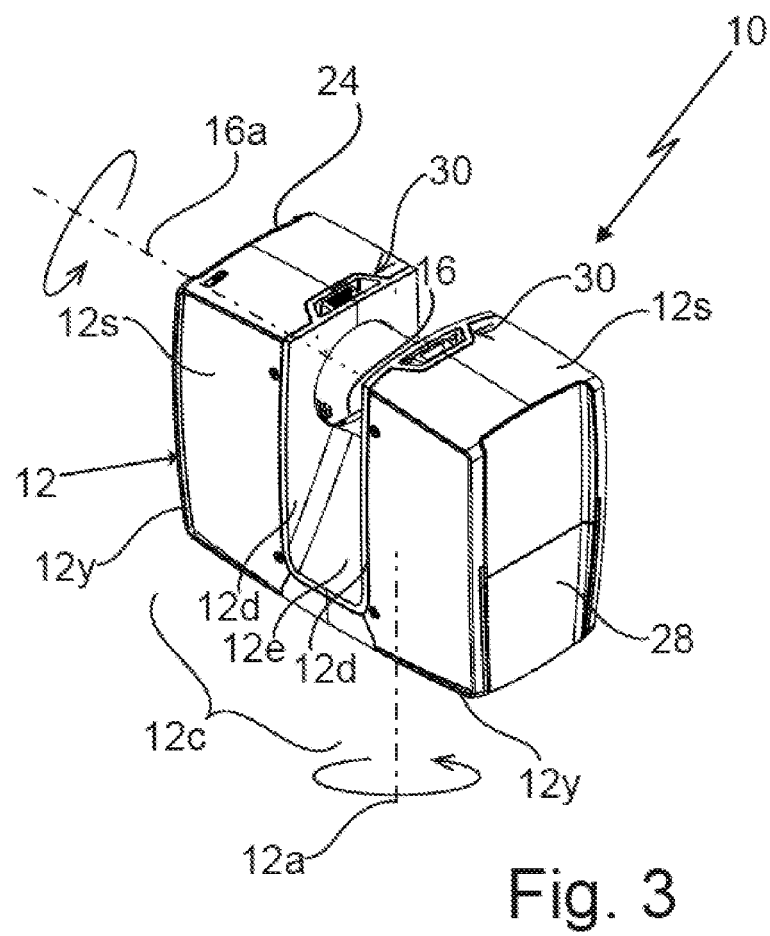
FIG. 3 is a perspective view of the 3D measurement device.
Figure 4:
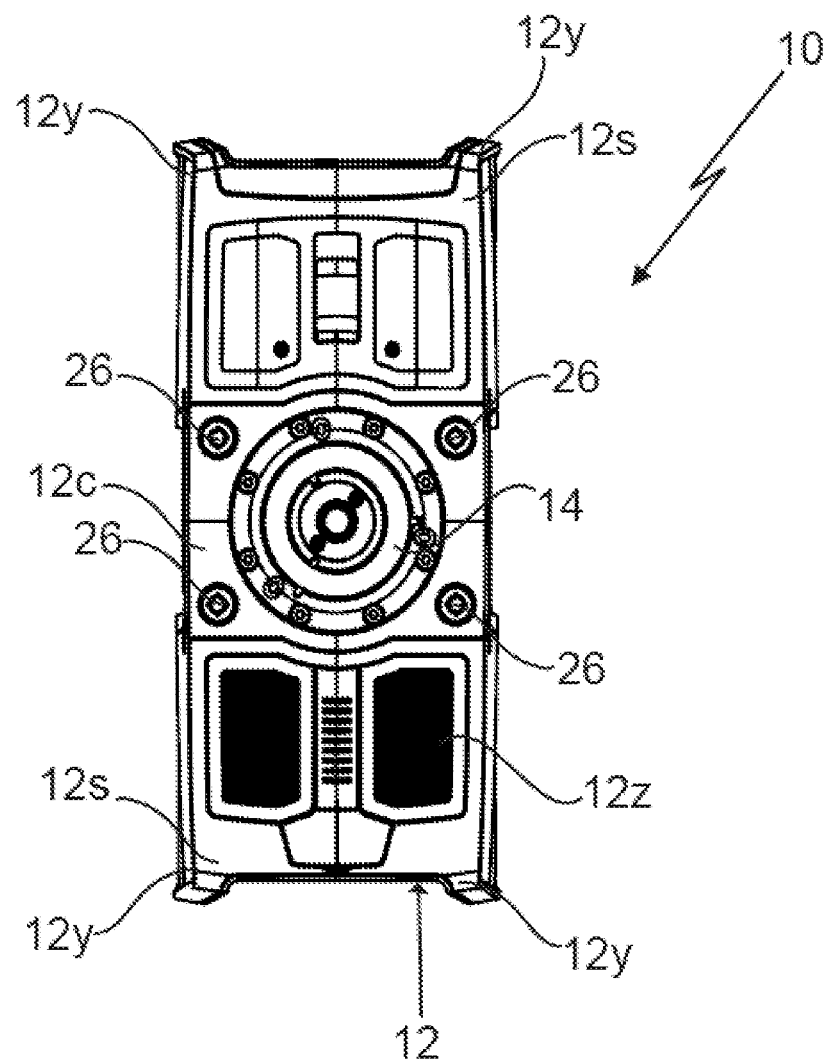
FIG. 4 is a view from the bottom of the 3D measurement device.
Figure 5:
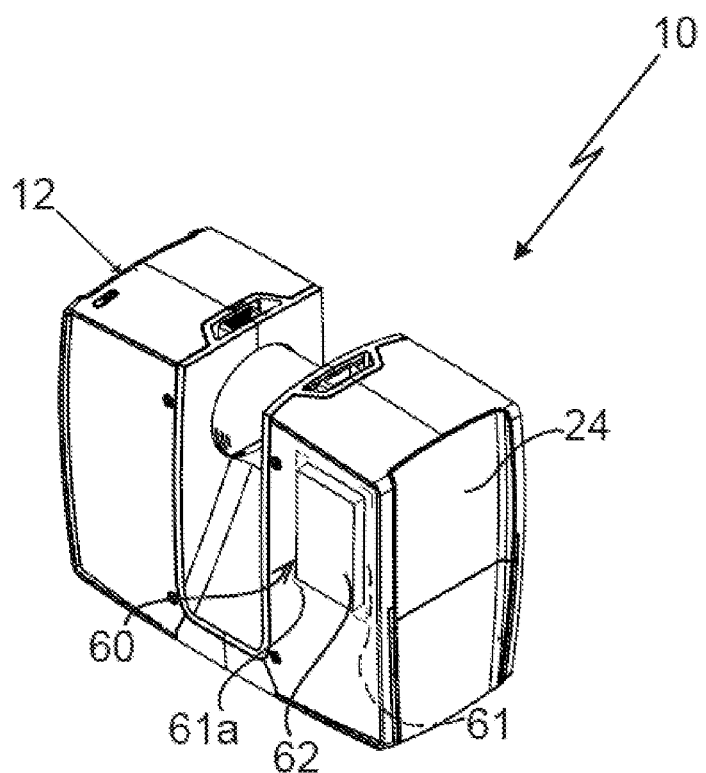
FIG. 5 is a perspective view of the 3D measurement device with NFC device attached.
Figure 6:
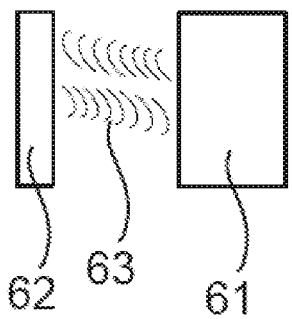
FIG. 6 is a schematic representation of the NFC link between the two NFC devices.
Figure 7:
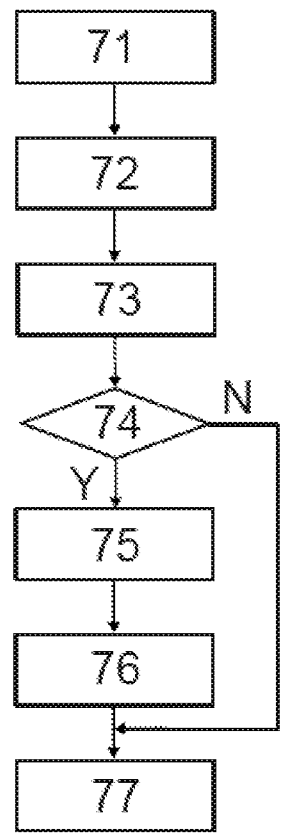
FIG. 7 is a flow chart of the start-up procedure.
Figure 8:
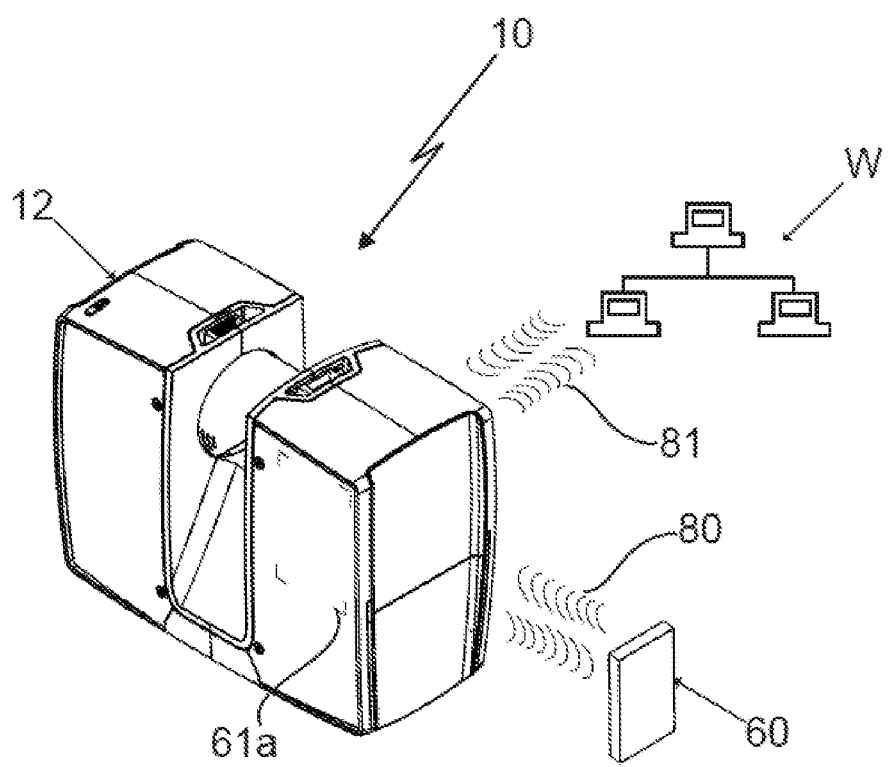
FIG. 8 is a perspective view of the 3D measurement device with remote control unit and connection to a network.
Figure 9:
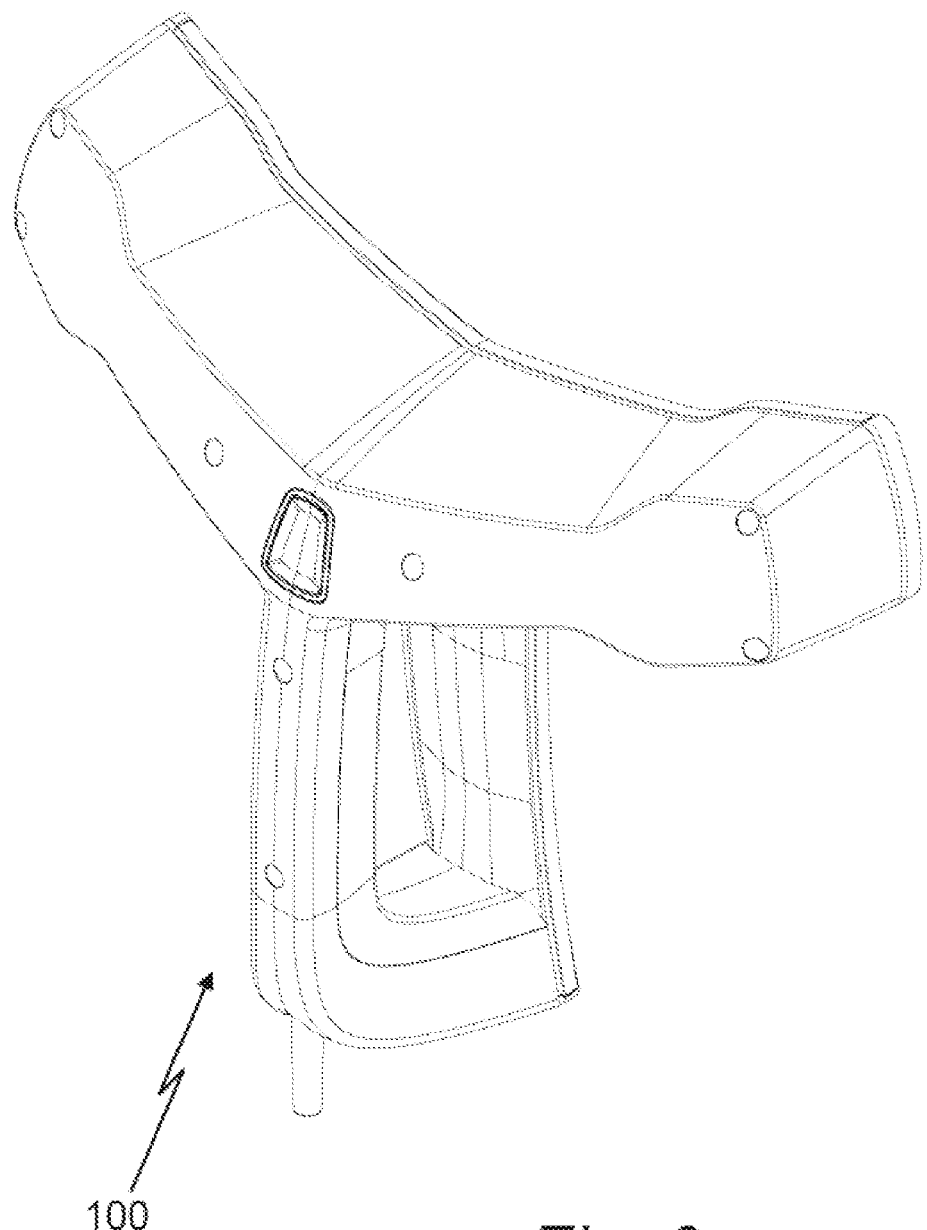
FIG. 9 is a perspective view of an alternative 3D measurement device.

The detailed description explains embodiments of the disclosure, together with advantages and features, by way of example with reference to the drawings.

DETAILED DESCRIPTION

One aspect of embodiments of the invention is to improve a method of the 3D measurement devices. In an embodiment, this is achieved according to the embodiments by a method having the features of claim 1. Advantageous embodiments are the subject matter of the dependent claims.

Operation of the 3D measurement device is preceded by a start-up procedure, in which the 3D measurement device is initialized in a number of start-up steps, or this initialization procedure is at least triggered. For individual initializations, the option of actuation by the user is useful. As a balance between user friendliness and access control, near field communication (near field communication, NFC) is advantageous. An NFC link is established between a first NFC device, which is assigned particularly to the 3D measurement device, and a second NFC device, which is assigned particularly to a remote control unit or a key.

Both an authorization of the user and an initialization— optionally customized for the user—of the 3D measurement device can be carried out or at least initiated via this NFC link. A start-up of a measurement process could also be triggered by a person or a movable vehicle or a robot. Other communication paths may also be activated in place of the NFC link, allowing the NFC link to be disabled.

The activation may also establish a connection to a network of computers, which—as an external part of a control and evaluation device of the 3D measurement device—can also perform some of the evaluations and other tasks of the 3D measurement device. If the energy demand of the 3D measurement device decreases as a result and evaluation hardware or battery capacity can be reduced, the size and weight of the 3D measurement device can be decreased or the operating time extended.

Referring now to the FIGS., embodiments of the present invention relates to a 3D (coordinate) measurement device which directs a beam of light onto an object O, which may be either a (cooperative) target, such as a reflector, or a non-cooperative target, for example a diffusely scattering surface of the object O. A distance meter in the 3D measurement device measures the distance to the object O (i.e., the distance d between the 3D measurement device and the object O), and angular position sensors measure the angular positions of two axes in the device. The measured distance and the two angles enable a processor in the device to determine the 3D coordinates of the object O. In the present case, the 3D measurement device in question is a laser scanner 10, however it will be obvious to a person skilled in the art that this can be easily extended to include a laser tracker or an entire station. Such a device may also be used in cases in which the 3D measurement device is used for measuring distance using projector-camera assemblies, triangulation, epipolar geometry or strip geometries.

Laser scanners are typically used for scanning closed or open spaces such as building interiors, industrial facilities and tunnels. Laser scanners are used for many purposes, including building information modeling (BIM), industrial analyses, accident reconstruction applications, archaeological studies and forensic investigations. A laser scanner can be used for optically detecting and measuring objects in the environment of the laser scanner by registering data points that represent objects within the environment. Such data points are obtained by directing a light beam onto the objects and collecting the reflected or scattered light to determine the distance, two angles (i.e., an azimuthal angle and a zenith angle), and optionally a gray scale value. These raw scan data are collected, stored and sent to one or more computers to generate a three-dimensional image that represents the scanned area or the scanned object. To generate the image, at least three values are collected for each data point. These three values may comprise the distance and two angles, or may be converted values, such as x, y, z coordinates.

The set of drawings shows a laser scanner 10 for optically scanning and measuring the environment of laser scanner 10. Laser scanner 10 has a measuring head 12 and a base 14. Measuring head 12 is mounted on base 14 such that measuring head 12 can be rotated about a first axis 12a relative to base 14, driven by a first rotary drive. This rotation about the first axis 12a can take place around the center of base 14. Measuring head 12 has a mirror 16, which can rotate about a second axis 16a, driven by a second rotary drive. With respect to a normal, upright (with respect to the gravitational direction) position of laser scanner 10, the first axis 12a can be designated as the vertical axis, or azimuthal axis, and the second axis 16a can be designated as the horizontal axis or zenith axis. Laser scanner 10 can have a cardan point or center $C_{10}$ which is the point of intersection of the first axis 12a and the second axis 16a. The first axis 12a defines the terms "top" and "bottom", even when the axis is inclined relative to the gravitational direction.

In the present embodiment, measuring head 12 has a support structure 12c in the form of a rigid supporting structure to which all other components of measuring head 12 are at least indirectly attached, and which may be an integral component made of metal, for example by aluminum die casting. Support structure 12c has two walls 12d, which are parallel to one another and to the first axis 12a, and has a cross-member 12e, which connects the two walls 12d in the region of their lower ends. Cross-member 12e is rotatably mounted on base 14 and holds the first rotary drive, designed for rotating measuring head 12 about first axis 12a, and the associated angular position sensor. In the upper region of walls 12d, i.e. above cross-member 12e, an open space is provided, within which mirror 16 is arranged, supported by one of the two walls 12d.

On each of two sides of support structure 12c, measuring head 12 further has a shell 12s, which may be made of a hard plastic. Each of the two shells 12s is associated with one of the two walls 12d and secured thereto (and therefore to support structure 12c), for example by means of screws. Support structure 12c and the two shells 12s form a housing for measuring head 12. The outer edges 12y of shells 12s are those edges of shells 12s that do not rest against support structure 12c. Outer edges 12y define a volume within which measuring head 12 in its entirety is arranged. In an embodiment, to protect measuring head 12 from damage, the outer edges 12y are configured as reinforced, and in the present embodiment are designed as protruding, thickened areas of material (beads) that are integral with the associated shell 12s. Alternatively, outer edges 12y may be reinforced by a separate bracket.

An upper region of shell 12s on the side of mirror 16 ("mirror-side" shell 12s) holds the second rotary drive for rotating mirror 16 about second axis 16a, along with the associated angular position sensor, and a lower region holds cooling mechanism 12z for the two rotary drives. The other shell 12s, on the side opposite mirror 16 ("receiver side" shell 12s), holds some of the optical and electronic components described in the following, along with the power supply, particularly the sensitive components that must be kept separate from the rotary drives with their electromagnetic interference fields.

Measuring head 12 has an emitter for emitting electromagnetic radiation, for example, a light emitter 17, which emits an emission light beam 18. In the exemplary embodiment, emission light beam 18 is a coherent light such as a laser beam. The laser beam may have a wavelength ranging from about 300 to 1600 nm, for example 790 nm, 905 nm, 1570 nm, or less than 400 nm. In principle, however, other electromagnetic waves having higher or lower wavelengths may be used. Emission light beam 18 may be amplitude-modulated or intensity-modulated, for example, with a sinusoidal or rectangular waveform. Alternatively, emission light beam 18 may also be modulated differently, for example by a chirp signal, or coherent receiving methods may be used. Emission light beam 18 is sent by light emitter 17 to mirror 16, where it is deflected and emitted to the environment of laser scanner 10.

A reflected light beam, hereinafter referred to as reception light beam 20, is reflected by an object O in the environment. The reflected or scattered light is captured by mirror 16 and deflected onto a light receiver 21 having reception optics. The directions of emission light beam 18 and reception light beam 20 result from the angular positions of measuring head 12 and mirror 16 about axis 12a or 16a. These angular positions are in turn dependent on the respective rotary drives. The angular position about first axis 12a is detected by a first angular position sensor. The angular position about second axis 16a is detected by a second angular position sensor. Mirror 16 is inclined 45° relative to second axis 16a. It thus deflects all incident beams by 90°, i.e., both emission light beam 18, which is incident along the second axis 16a, and reception light beam 20, which is deflected parallel to the second axis 16a toward the reception optics.

A control and evaluation device 22 is data-connected to light emitter 17 and to light receiver 21 in measuring head 12. Since control and evaluation device 22 is a less sensitive component than light receiver 21, it may be located in various places in measuring head 12. In the present embodiment, it is located for the most part within the mirror-side shell 12s. Parts of control and evaluation device 22 may also be arranged outside of measuring head 12, for example as a computer connected to base 14. Control and evaluation device 22 is designed to determine, for a plurality of measuring points X, a corresponding number of distances d between laser scanner 10 and measuring points X on object O. The distance from a specific measuring point X is determined at least in part by the speed of light in the air through which the electromagnetic radiation is propagated from the device to measuring point X. In the exemplary embodiment, the phase shift in the modulated light beam 18, 20, which is sent to the measuring point X and received from there, is determined and is evaluated to obtain a measured distance d.

The speed of light in air is dependent on the characteristics of the air such as air temperature, air pressure, relative humidity and carbon dioxide concentration. These air characteristics influence the refraction index of the air. The speed of light in air is equal to the speed of light in a vacuum divided by the refraction index. A laser scanner of the type described herein is based on the light propagation time in air (the propagation time required for light to travel from the device up to the object and back to the device). A method for distance measurement based on the light propagation time (or the propagation time of another type of electromagnetic radiation) is dependent on the speed of light in air and is therefore easily distinguishable from distance measurement methods based on triangulation. In methods based on triangulation, light is emitted by its light source in a certain direction, and is then collected on a camera pixel in a certain direction. Since the distance between the camera and the projector is known, and since a projected angle is compared with a receiving angle, the triangulation method allows the distance from the object to be determined based on a known length and two known angles of a triangle. The triangulation method thus is not dependent directly on the speed of light in air.

Measuring head 12 may have a pointing and display device 24, which is integrated into laser scanner 10. Pointing and display device 24 may be equipped with a user interface, for example, which allows the operator to supply laser scanner 10 with measurement instructions, in particular to define the parameters or to start the operation of laser scanner 10, and pointing and display device 24 may also display measurement results—in addition to parameters. In the embodiment example, pointing and display device 24 is located on the end face of mirror-side shell 12s, and its user interface is designed as a graphic touch screen.

In addition to detecting distance d from center $C_{10}$ to a measuring point X, laser scanner 10 can also detect a gray scale value with respect to the received optical power. The gray scale value can be determined, for example, by integrating the bandpass-filtered and amplified signal in the light receiver 21 over a measurement period assigned to measuring points X. Optionally, a color camera 25 may be used for generating color images. Using these color images, colors (R, G, B) may also be assigned as additional values to measuring points X.

In one embodiment, the operating mode of laser scanner 10 is referred to as the "sphere mode", the environment around laser scanner 10 is scanned by rapidly rotating mirror 16 around second axis 16a while measuring head 12 rotates slowly around first axis 12a. In one embodiment example, mirror 16 rotates at a maximum speed of 5820 revolutions per minute. A scan is defined as the totality of measuring points X in such a measurement. For such a scan, center $C_{10}$ defines the origin of the local stationary reference system. Base 14 rests in this local stationary reference system. In sphere mode, the scan corresponds to a spherical point cloud, apart from the area which is shaded by cross-member 12e.

In another embodiment, the operating mode of laser scanner 10 is referred to as the "helix" mode, mirror 16 rotates about second axis 16a, while measuring head 12 remains stationary relative to base 14. Laser scanner 10 is mounted on a carriage, for example, which moves when laser scanner 10 is in use. In helix mode, the scan has a helical shape. Measuring head 12 may have immobilization means 26 for immobilizing measuring head 12 on the carriage, optionally provided on base 14 or some other support that supports both base 14 and measuring head 12. Immobilization means 26 bridge the bearing between measuring head 12 and base 14, thereby protecting against damage. The immobilization means may also make it unnecessary to immobilize base 14 on the carriage (which would also be advantageous in terms of redundancies), i.e. laser scanner 10 as a whole is immobilized on the carriage simply via immobilization means 26. In this embodiment, immobilization means 26 is designed as threaded bores, via which measuring head 12 can be screw connected to the carriage or other support.

Light emitter 17, light receiver 21 and the associated optics are arranged in an upper region of the receiver-side shell 12s of measuring head 12. In the lower region of this receiver-side shell 12s, a battery pack 28 which serves as the power supply for laser scanner 10 is arranged, such as behind a protective cover, which can be at least partially removed from shell 12s. The protective cover may be a pivotable protective lid. Battery pack 28 may be configured as replaceable and rechargeable.

At the start of operation of laser scanner 10, the user may control laser scanner 10 directly through manual input into pointing and display device 24. It is also useful, however, particularly during operation, to be able to control laser scanner 10, or a 3D measurement device in general, via a remote control unit 60, designed for example as a smartphone or tablet or PC. In either case, the start-up procedure performed at the start of operation determines whether such control is possible.

In one variant of the present embodiment, near field communication (NFC) is provided for this purpose, consisting of a first NFC device 61—such as a stationary device—, a second NFC device 62—such as a mobile device—and an at least temporary NFC link 63 between the two NFC devices 61, 62. In the present case, NFC link 63 is based on RFID, i.e. two antennas are coupled by electromagnetic induction in the radio wave range. As is known, a protocol exists by which the transfer of data via NFC link 63 is accompanied by reciprocal acknowledgments (handshakes).

The first NFC device 61 is disposed in or on laser scanner 10, or generally on the 3D measurement device. In the present embodiment, the first NFC device 61 may be integrated into measuring head 12, for example as part of pointing and display device 24, or is connected to the measuring head. One important component of the first NFC device 61 is the antenna, which is located just below the surface of the housing of measuring head 12, in the present case on the inside of one of the two shells 12s. The position of the antenna (or the ideal position for communicating with it and thus with the first NFC device 61), for example, to the side of the touch screen of control and display device 24, may be identified by markings 61a on the outside of the housing of measuring head 12.

The second NFC device 62 may be integrated into the (e.g. portable and mobile) remote control unit 60, i.e. for example into a smartphone or tablet or PC. However, the second NFC device 62 may also be designed as a separate device (or remote control functions). It is also conceivable for the second NFC device 62 to be a passive smart card or RFID tag. The configuration of the antenna of the second NFC device 62 is known per se, for example as in a smartphone or RFID tag.

Said start-up procedure begins with a first start-up step 71, in which second NFC device 62 is positioned very close to first NFC device 61, i.e. the two antennas are spaced as close to one another as possible (mm range). One of the two antennas transmits, the other receives, and by a (mutual) transmission of data (and in the case of a passive second NFC device 62, a transfer of energy), the NFC link 63 is established in a second start-up step 72. Once the NFC link 63 has been established, a set of functions of the near field communication according to the embodiments disclosed herein is executed.

The first function is the authorization function, in other words a key. The second NFS device 62 has a unique (digital) identifier, which is permanently stored in second NFC device 62 or is generated by said device as needed. In a third start-up step 73 this identifier is transmitted to the first NFC device 61. In a fourth start-up step 74, the identifier is used to check whether the second NFC device 62 is authorized to communicate with the first NFC device 61. This check involves a comparison with a stored list of authorized identifiers, for example, in the control and evaluation device 22. If the verification is successful (Y), in other words if the user and the second NFC device 62 are authorized, then in a fifth start-up step 75 the second NFC device 62 may transfer the desired commands for laser scanner 10 to the first NFC device 61, particularly for the functions listed in the following, which are then executed in a sixth start-up step 76 in laser scanner 10. If the verification fails (N), NFC link 63 is terminated (and the start-up procedure is discontinued), and the second NFC device 62 can be separated from measuring head 12 in the seventh start-up step 77.

The second function is that of initializing laser scanner 10 (or the 3D measurement device in general). In the simplest case, laser scanner 10 has a single start-up procedure with only one set of defined parameters. In some embodiments, however, multiple sets of parameters are stored in laser scanner 10, forming different profiles for different users. The set of parameters may be selected based on the identifier of the second NFC device 62 or through a specific request input by the user. This begins the start-up procedure of laser scanner 10, which not only writes the parameters into the working memory of control and evaluation device 22, but also retrieves the current angular positions of measuring head 12 and mirror 16 and if necessary moves these components into a defined position.

The third function is that of activating additional communication paths, particularly for using remote control unit 60. One (or more) short-range connections 80, such as WLAN or Bluetooth, may be activated. The access data required for this may also be supplied or released by the second NFC device 62. A short-range connection 70 of this type is required for the device in which the second NFC device 62 is integrated, for example the smartphone or tablet, or a separate device, to act as remote control unit 60. Additionally (or alternatively), one (or more) long-range connection(s) 81 may also be activated, which operate, for example, based on LTE or similar or even higher communication standards. In addition to being used for remote control unit 60, these additional communication paths 80, 81 may also be used to connect laser scanner 10 to a network W of computers and optionally other laser scanners 10. Activation of the additional communication channels 80, 81 may also include the transfer of defined addresses or other parameters for the communication paths 80, 81. Following activation, in the seventh start-up step, second NFC device 62 can be removed spatially from measuring head 12, and remote control unit 60 takes over control of laser scanner 10 from a certain distance, for example several meters.

In an embodiment, all three functions in this group of functions are performed, i.e., the second NFC device 62 serves as a key and for initializing laser scanner 10, and activates remote control unit 60 and any other communication channels 80, 81. If necessary, one or two features from said group need not be implemented, for example when retrieving the key or initializing the laser scanner will be performed by remote control unit 60, or when no key or no remote control unit 60 is provided, for example, when in place of the wireless (i.e., radio-based) short-range connection 80, a wired connection is provided between laser scanner 10 and the actuating device. The steps of the start-up procedure are then adjusted accordingly.

The long-range connection 81 to network W is a high-speed, broadband, wireless link to a radio cell of a mobile cellular network. Network W links the involved computers and optionally laser scanner 10 by wired and wireless connections. Network W is (typically) publicly accessible, however the long-range connection 81 is (typically) subjected to a security protocol, so that access to this connection requires special access data from laser scanner 10.

High-speed data transmission by means of long-range connection 81 makes it possible to transmit data regarding measuring points X or other measurement data during a scanning project into network W, where they can be selectively stored (on certain computers) or in the cloud, and may also be processed, in other words as an external (i.e. outside of measuring head 12) part of control and evaluation device 22. Typical processing steps that may be performed in network W include applying specific data filters to which the measurement data are subjected and which eliminate or correct outliers or measurement errors, for example. In particular, scans may be registered in network W, i.e. when laser scanner 10 generates multiple scans of the same scene from various positions, these scans are transmitted to the network by means of long-range connection 81, where their position is then identified in a common system of coordinates. If color camera 25 generates color 2D images which are transmitted to network W, the associated scans can be colored with the colors (R, G, B) of these 2D images in network W. All of the data may also be processed for subsequent analysis and visualization.

The data may be transmitted in both directions (bidirectionally). In particular, feedback from network W to laser scanner 10 is possible, in which laser scanner 10 receives evaluation data (generated from the measurement data) or other data from network W. The evaluation data also include, for example, data from analyses and visualizations, and the other data also include commands, for example. The speed of data transmission and the volume of data transmission may differ significantly, i.e. by multiple times, between upload (from laser scanner 10 into network W) and download (from network W to laser scanner 10). Depending on the specific type of data transmission and on the data processing in network W, various options for transmitting feedback from network W to laser scanner 10 are conceivable.

One option is to transmit the entire instantaneous point cloud consisting of all the measuring points X for the scan registered in the common system of coordinates, optionally expanded to include data from other laser scanners or 3D measurement devices or other 3D data acquisition systems, from network W to laser scanner 10. In a variation of this, it is sufficient for three sets of displacement coordinates and three rotation angles about three axes to be transmitted back to laser scanner 10 for each scan by laser scanner 10 which is supplied as registration information to network W. These six values received by laser scanner 10, which can be treated as a six-dimensional vector, indicate how center $C_{10}$ of the scan should be displaced relative to the center of the common system of coordinates, and how the scan should be rotated relative to the axes of the common system of coordinates. Control and evaluation device 22 in laser scanner 10 then determines the overall point cloud from the scans available to it.

In either case, the control and evaluation device 22 can then generate 2D images from this overall point cloud, which are then displayed by pointing and display device 24. This provides the user with an overview of the instantaneous state of the scanning project. Alternatively, a number of selected 2D projection images from the overall point cloud could be identified in network W, and then transmitted back to laser scanner 10 for display on pointing and display device 24.

Additional possibilities are provided by the 2D images from color camera 25. Each measuring point X has three spatial coordinates and the intensity values, originally in the form of gray scale values, and in the case of a colored scan in the form of colors. For a low dynamics range, three times 8 bits are used, and for a high dynamics range three times 24 bits are used. Once the intensity, also referred to as brightness, has been measured in gray scale levels and has been provided to control and evaluation device 22 in laser scanner 10, it is sufficient, after coloring the scan in network W, to transmit the additional information, that is to say, the hue and saturation, back to laser scanner 10. For each scan supplied to network W, laser scanner 10 can then merge the data received from network W and the data measured by the laser scanner to form the colored scan.

In an alternative embodiment, a 3D measurement device 100 is provided, which has a projector as light emitter 17. The projector projects a pattern into the environment of 3D measurement device, where it strikes objects O and is scattered on their surfaces. The pattern projected onto the surface of objects O is recorded by 3D measurement device 100 by means of two cameras as light receivers 21. The projector and the two cameras form a triangular configuration. Utilizing geometric conditions, for example an epipolar geometry, a control and evaluation device 22 of 3D measurement device 100 determines measuring points X and the distances d thereof from 3D measurement device 100.

This 3D measurement device 100 may also comprise a first NFC device 61, with which a second NFC device 62 communicates at least intermittently via an NFC link 63 to initiate a start-up procedure. Here again, the three functions of the key, initialization and activation of communication paths 80, 81 are possible. The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method for optically scanning and measuring an environment using a 3D measurement device, the method comprising:
    providing the 3D measurement device having a light emitter operable to emit at least one emission light beam, the 3D measurement device further having a light receiver operable to receive at least one reception light beam, the 3D measurement device further having a control and evaluation device that is operable to determine at least the distance to an object for each of a plurality of measuring points based at least in part on the at least one emission light beam and the at least one reception light beam;
    providing the 3D measurement device with a first near-field communication (NFC) device that is electrically coupled to the control and evaluation device, the first NFC device having a first antenna;
    positioning a second NFC device adjacent the 3D measurement device, the second NFC device having a second antenna;
    establishing an NFC link between the first NFC device and the 3D measurement device;
    transmitting an identifier from the second NFC device to the 3D measurement device;
    determining that the second NFC device is authorized to communicate with the 3D measurement device based at least in part on the identifier; and
    transferring commands to the 3D measurement device from the second NFC device based at least in part on the determination that the second NFC device is authorized to communicate with the 3D measurement device.

2. The method according to claim 1, characterized in that the second NFC device is integrated into a remote control unit (60) which is sized to be portable and mobile.

3. The method of claim 2 wherein the command causes the 3D measurement device to perform at least one function in a group of functions that comprises an authorization as the first function, an initialization of the 3D measurement device) as the second function and an activation of a remote control unit and establishment of at least one communication path as the third function.

4. The method of claim 3, further comprising:
determining the second NFC device is not authorized to communicate with the 3D measurement device;
terminating the NFC link; and
separating the second NFC device from the first NFC device.

5. The method of claim 3, further comprising:
transmitting data for the measuring points or other measurement data into a computer network having at least one connected computer;
storing the data for the measuring points or other measurement data on the at least one connected computer; and
transmitting to the 3D measurement device via the computer network evaluation data or other data generated from the measurement data.

6. The method of claim 5, further comprising:
registering a plurality of scan data in a common system of coordinates with the at least one connected computer; and
transmitting to the 3D measurement device, for each of the plurality of scan data, three sets of coordinates for a displacement and three angles for a rotation of the scan data relative to the common system of coordinates.

7. The method of claim 6, further comprising providing the 3D measurement device with a color camera, wherein the other measurement data includes 2D images.

8. The method of claim 7, further comprising:
determining, with the at least one connected computer, a hue and saturation parameter from the 2D images;
transmitting the hue and saturation parameter to the 3D measurement device; and
merging, with the 3D measurement device, the hue and saturation parameters with the measurement data to form a colored scan.

* * * * *